US011415481B2

(12) United States Patent
Bolshtyansky

(10) Patent No.: US 11,415,481 B2
(45) Date of Patent: Aug. 16, 2022

(54) LINE MONITORING SYSTEM HAVING HETERODYNE COHERENT DETECTION

(71) Applicant: SUBCOM, LLC, Eatontown, NJ (US)

(72) Inventor: Maxim A. Bolshtyansky, Millstone, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 147 days.

(21) Appl. No.: 16/990,937

(22) Filed: Aug. 11, 2020

(65) Prior Publication Data

US 2022/0050014 A1 Feb. 17, 2022

(51) Int. Cl.
*G01M 11/00* (2006.01)
*H04B 10/077* (2013.01)
*H04B 10/079* (2013.01)

(52) U.S. Cl.
CPC ........ *G01M 11/335* (2013.01); *G01M 11/331* (2013.01); *H04B 10/0771* (2013.01); *H04B 10/0775* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 6,690,884 B1* | 2/2004 | Kelty | .................... | H04B 10/695 714/704 |
| 2003/0147138 A1* | 8/2003 | Price | .................... | H04B 10/675 359/578 |
| 2003/0165006 A1* | 9/2003 | Stephens | .............. | H04B 10/294 359/337 |
| 2004/0028406 A1* | 2/2004 | Bortz | ................. | H04Q 11/0005 398/49 |

FOREIGN PATENT DOCUMENTS

| | | |
|---|---|---|
| CN | 111044081 A | 4/2020 |
| WO | 2004005973 A2 | 1/2004 |

OTHER PUBLICATIONS

XP011858339, "Distributed Optical Fiber Sensing Assisted by Optical Communication Techniques", Journal of Lightwave Technology, IEEE, USA, vol. 39, No. 12, dated Feb. 8, 2021, ISSN: 0733-8724, DOI: 10.1109/JLT.2021.3057670, [retrieved on Jun. 3, 2021], 3654-3670 pages.
EP Search Report dated Oct. 6, 2021, for the EP Patent Application No. 21169486.4, filed on Apr. 20, 2021, 8 pages.

* cited by examiner

*Primary Examiner* — Darren E Wolf
(74) *Attorney, Agent, or Firm* — KDB Firm PLLC

(57) ABSTRACT

A line monitoring system may include a laser source to launch a probe signal over a first bandwidth, a polarization maintaining tap to receive and split the probe signal, into a first portion and a second portion, a polarization rotator to receive the first portion and send the first portion to a transmission system, a return tap to receive the second portion and to receive a return signal from the transmission system, wherein the return signal being derived from the first portion, a photodetector coupled to receive an interference signal from the return tap, wherein the interference signal is generated by a mixing the return signal and the second portion, where the photodetector is arranged to output a power signal based upon the interference signal, and a power measurement system to measure the power signal at a given measurement frequency over a second bandwidth, comparable to the first bandwidth.

21 Claims, 8 Drawing Sheets

FIG. 3    300

LINE MONITORING SYSTEM HAVING HETERODYNE COHERENT DETECTION

FIELD OF THE DISCLOSURE

This disclosure relates generally to the field of optical communication networks and relates more particularly to techniques for measuring defects in optical fibers.

BACKGROUND

Line monitoring systems (LMS) are used for monitoring optical fibers such as in underseas cable and may employ high a high-loss-loop-back (HLLB) configuration, where at each repeater of the system, a HLLB arrangement taps a fraction of the arriving probe-tone signal and couples the signal back into the opposite direction. A probe signal may be launched from a laser source, such as a cavity laser to be combined with information bearing channels on an outbound direction sent to the transmission system of the underseas cable. The transmission system generates an optical LMS response signal in the outbound direction due to the HLLB arrangement.

Subsea fiber optical communications systems need routine monitoring to guarantee their performance and minimize potential loss of service by detecting and solving wet plant faults and possibly aggressive threats at an early stage. Currently established monitoring technologies include the use of line monitoring systems (LMS) to detect signal peaks looped back from each undersea repeater and terminal with high loss loopback (HLLB) technology.

When there is a fault along the optical path, the amplitudes of these loopback signals change in the repeaters surrounding the fault location. The changes present distinct patterns which patterns may be utilized to identify fault conditions. Such fault conditions may be due to changes in fiber span loss, changes in optical amplifier pump laser output power, and fiber breaks.

In known systems, before entering a transmission system, a laser probe signal is generated by a laser source and the laser signal may be broadened from to an appropriate bandwidth, such as 1 GHz. The broadened signal may be transmitted as a polarization maintaining signal to a polarization rotator that operates at a desired frequency, such as 1 GHz. The signal may then be modulated using on-off-keying (OOK) data before entering the transmission system. The return signal may then pass through a component such as a wavelength selective switch (WSS), to filter out a portion of the returned signal. For example, the WSS may pass approximately 25 GHz of the LMS band, rejecting information bearing channels that lie outside of this band. This 25 GHz band contains both the LMS response signal and noise generated in the system, including noise generated by system amplifiers. A photodetector may then be arranged to capture the optical signals generated in this 25 GHz band and generate an electrical signal, including the LMS probe signal. Due to the relatively low level of the LMS probe signal, the signal-to-noise ratio for is relatively low.

One of the ways to increase signal-to-noise ratio is to reduce the bandwidth of the optical filtering. However, this approach requires extra components, and having optical filtering at a bandwidth smaller than 1 GHz is usually difficult. With respect to these and other considerations the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In a first embodiment, a line monitoring system may include a laser source to launch a probe signal over a first bandwidth, a polarization maintaining tap to receive and split the probe signal, into a first portion and a second portion, a polarization rotator to receive the first portion and send the first portion to a transmission system. The line monitoring system may further include a return tap to receive the second portion and to receive a return signal from the transmission system, wherein the return signal being derived from the first portion, a photodetector coupled to receive an interference signal from the return tap, wherein the interference signal is generated by a mixing the return signal and the second portion, where the photodetector is arranged to output a power signal based upon the interference signal, and a power measurement system to measure the power signal at a given measurement frequency over a second bandwidth, comparable to the first bandwidth.

In another embodiment, a method of measuring a fault in a transmission system may include launching a probe beam from a laser probe source, the probe beam having a first bandwidth, directing a first portion of the probe beam to a transmission system, and directing a second portion of the probe beam to a return tap. The method may include receiving at the return tap, a return signal from the transmission system, the return signal being based upon the first portion of the probe beam, mixing the second portion of the probe beam and the return signal to generate an interference signal, generating a power signal based upon the interference signal, and measuring the power signal at a given measurement frequency over a second bandwidth, comparable to the first bandwidth.

In a further embodiment, a method of measuring a fault in a transmission system, may include launching a probe beam from a laser probe source, the probe beam having a narrow bandwidth, directing a first portion of the probe beam to a transmission system, and directing a second portion of the probe beam to a frequency shifter assembly to form a frequency shifted beam, and receiving at a return tap, the frequency shifted beam and a return signal from the transmission system. As such, the return signal may be based upon the first portion of the probe beam. The method may include mixing the frequency shifted beam and the return signal to generate an interference signal, generating a power signal based upon the interference signal, and measuring the power signal at a given measurement frequency over a second bandwidth, comparable to the first bandwidth or comparable to a larger one of: the first bandwidth and a sampling rate of the measuring the power signal.

In a further embodiment, a method of measuring a fault in a transmission system, includes: launching a probe beam from a laser probe source, directing a first portion of the probe beam to a transmission system, directing a second portion of the probe beam to a return tap, generating an interference signal by combining the second portion of the probe beam with a return signal from the transmission system, the return signal being based upon the first portion of the probe beam, and converting the interference signal to an electrical power signal at a photodetector.

DETAILED DESCRIPTION

The present embodiments may be useful to facilitate significantly improving signal-to-noise ratio in LMS systems, by using coherent detection methods together with heterodyne mixing and performing filtering over a narrower bandwidth in the electrical domain.

According to various embodiments of the disclosure, a portion of light that is generated from a laser probe source is split sending to a transmission system, and is added to the return signal using a tap. This split portion of the light may interfere with the returned signal where the interference is detected by a single photodetector. The rest of processing of the signals may be performed by electronics or in software/firmware, and involves measuring electrical power at one or more frequencies. As such, the bandwidth of electrical filters used to measure the electrical power may be much smaller than the optical filter bandwidth of, e.g., 25 GHz, and thus a significant portion of the noise is removed, leading to a higher signal-to-noise ratio in the detected LMS signal.

Figure 1:
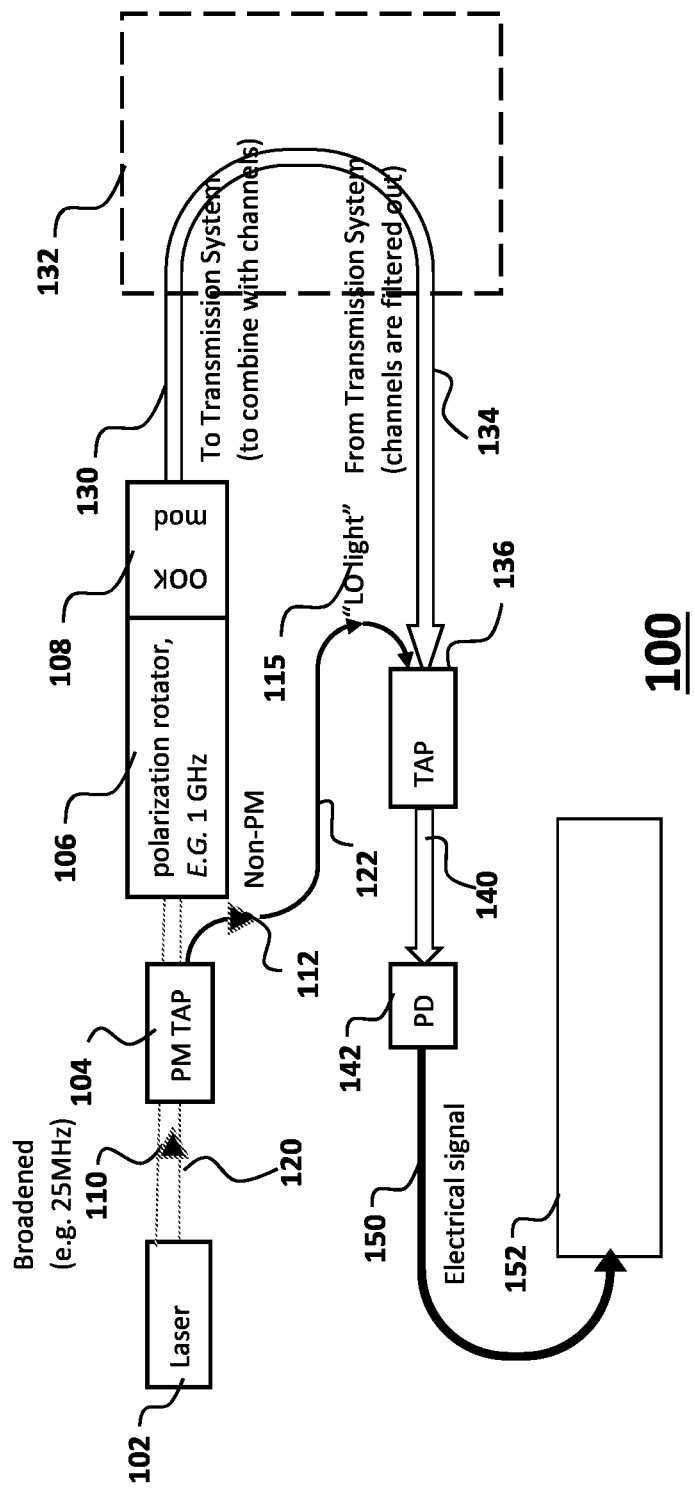
FIG. 1 is a schematic diagram illustrating an exemplary embodiment of a line measurement system for testing an optical fiber, in accordance with the present disclosure.

FIG. 1 is a schematic diagram illustrating an exemplary embodiment of a line measurement system 100 for testing an optical fiber, in accordance with the present disclosure. The line monitoring system (LMS) 100 includes a laser source 102 to generate a probe signal, shown as probe beam 120, where the probe beam is broadened to a targeted bandwidth, in the range of 25 MHz, such as 10 MHz, 25 MHz, 50 MHz, 100 MHz, or similar value according to various non-limiting embodiments. Considerations for selection of the targeted bandwidth include the minimum value for an electrical filter used to detect a return signal. In other words, the value of the targeted bandwidth of the probe beam may define the minimum value of that used by the electrical filter. In practical designs, this value will be a compromise between different aspects of the LMS, such as electronics speed, potential nonlinear penalties of light inside a fiber, and so on.

The LMS 100 includes a polarization maintaining tap 104, disposed to receive the probe beam 120, a polarization rotator 106 to receive a first portion 130 of the probe beam 120 and send the first portion 130 to a transmission system 132. The polarization maintaining tap 104 is configured to split the probe beam 120 to output a second portion 122 of the probe beam 120 as a non-polarization maintaining signal.

The LMS 100 further includes a return tap 136 to receive the second portion 122 of the probe beam 120 and to receive a return signal 134 from the transmission system 132 (where channels, such as information bearing channels, may be filtered out), wherein the return signal 134 is derived from the first portion 130 of the probe beam 120. The LMS 100 further includes a photodetector 142, coupled to receive an interference signal 140 from the return tap 136, where the interference signal 140 is generated by a mixing of the return signal 134 and the second portion 122 of the probe beam 120. The photodetector 142 may operate as a known photodetector to output an electrical signal, shown as power signal 150, proportional to the intensity of the interference signal 140. The LMS system 100 further includes a power measurement system 152 to measure the power signal over a second bandwidth, comparable to the first bandwidth of the output probe beam from the laser source 102.

The LMS 100 may optionally include a first filter amplifier (EDFA) 110, disposed to receive the probe beam 120, and a second filter amplifier 112, disposed to receive the second portion 122 of the probe beam 120. According to various embodiments, the "LO light" (stands for local oscillator light, shown as LO 115 in the figure) shown in FIG. 1 should be significantly more powerful than the return signal 134, so that some amplification might be required, where the first filter amplifier 110 and second filter amplifier 112 represent possible locations of optional filter amplifiers.

In addition, the LMS 100 may include an On-off keying (OOK) component 108, included separately or part of the polarization rotator to modulate the polarization-rotated probe beam with OOK data. According to various embodiments of the disclosure, the LMS 100 performs broadening of a probe beam emitted by a laser to facilitate averaging over different optical phases during a single OOK pulse. In order to perform this averaging, the power measurement of an electrical signal (also referred to as a "power signal") may be performed at the frequency of the polarization rotator (1 GHz in one non-limiting example) and in a bandwidth similar to or the same as the bandwidth of the probe beam 120 (25 MHz in one non-limiting example). To facilitate proper detection of the interference signal 140, the power measurement system 152 may perform an averaging of the electrical power at the frequency of the polarization rotator 106 as follows: In particular, according to various embodiments, the detected OOK pulses have a rather long duration (100 μs in one non-limiting example), so that the electrical power at the polarization rotator frequency is to be averaged over a time length (sampling period) that is comparable to the pulse duration.

In the above manner, FIG. 1 provides a first embodiment of an approach that combines coherent detection methods with heterodyne mixing and filtering with narrower bandwidth in the electrical domain. This approach may thus overcome the relatively low signal-to-noise ratio delivered by known LMS approaches, where a (for example, 25 GHz wide) return signal contains both the LMS response signal and noise generated in the system. While the embodiment of FIG. 1 provides a relatively simpler approach to improve signal-to-noise ratio in an LMS system, a potential disadvantage of this implementation is that the detection is performed with just one polarization of LO light. This approach may result in reduced accuracy in systems with large time varying polarization dependent loss.

Figure 2:
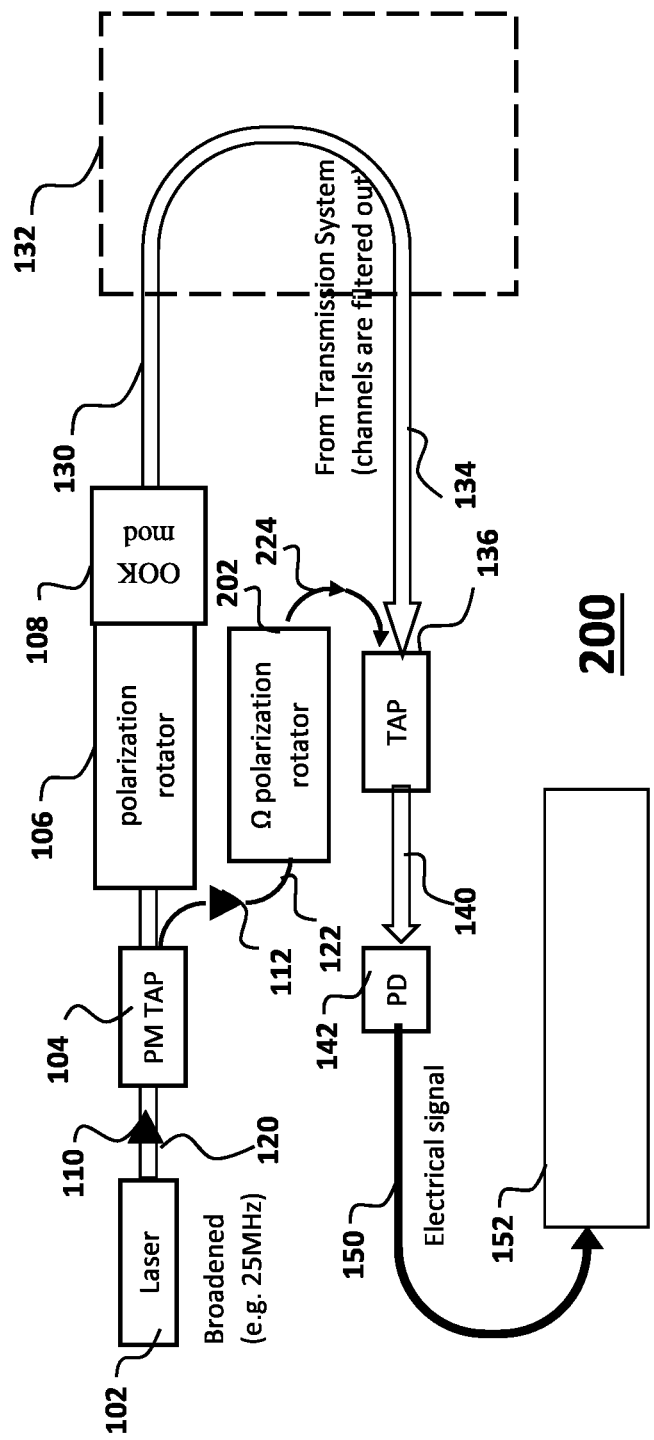
FIG. 2 is a schematic diagram illustrating an exemplary embodiment of another line measurement system for testing an optical fiber, in accordance with the present disclosure.

To address this issue, other embodiments of the disclosure present additional LMS that include additional components, as described below. FIG. 2 is a schematic diagram illustrating an exemplary embodiment of another line measurement system for testing an optical fiber, in accordance with the present disclosure. In this example, an LMS 200 is shown, including some similar components to LMS 100, where like components are labeled the same. In this embodiment, a dual polarization approach with a broadened laser source beam is employed. In this configuration, a polarization rotator 202 is added to the path of the second portion 122 of the probe beam 120, so that a rotated portion 224 is returned to the return tap 136, to be combined with the return signal 134.

In this embodiment, the polarization of the second portion 122 of the probe beam 120 is rotated by the polarization rotator 202 at a target frequency $\Omega$ (for example 100 MHz). Detection may be arranged to take place at a detection frequency corresponding to the frequency difference in polarization rotators, or alternatively, may be arranged to take place at a frequency sum of the polarization rotator frequencies. Again, in the embodiments of FIG. 2, the detection bandwidth may be arranged to be similar to the broadened bandwidth of the probe beam 120 output by the laser source 102. Note that for both single polarization and dual polarization approaches the reduction of the noise is expected to be proportional to the ratio of the bandwidth of the original optical filter to that of the electrical filter. In one non-limiting example, this ratio may be calculated as the ratio of 25 GHz to 25 MHz, which value is 30 dB.

The aforementioned broadened laser approaches will benefit from the possibility of making the laser truly broadened, i.e. the phase of the laser should be a random process. Such devices may be difficult to implement, because the conventional approach of the broadening involves modulation of the laser current or mirror, which approach, while creating a broadened signal, generates a broadening that itself may be an oscillation of the central optical frequency of the laser. In this case, the phase of the beam output by the laser is not random, and the averaging over the optical phase may generate some artifacts. Thus, the approaches of FIGS. 1 and 2, if implemented with conventional broadening components, may be effective in reducing signal-to-noise ratio, but may generate artifacts in the detected signal that need to be accounted for.

Figure 3:
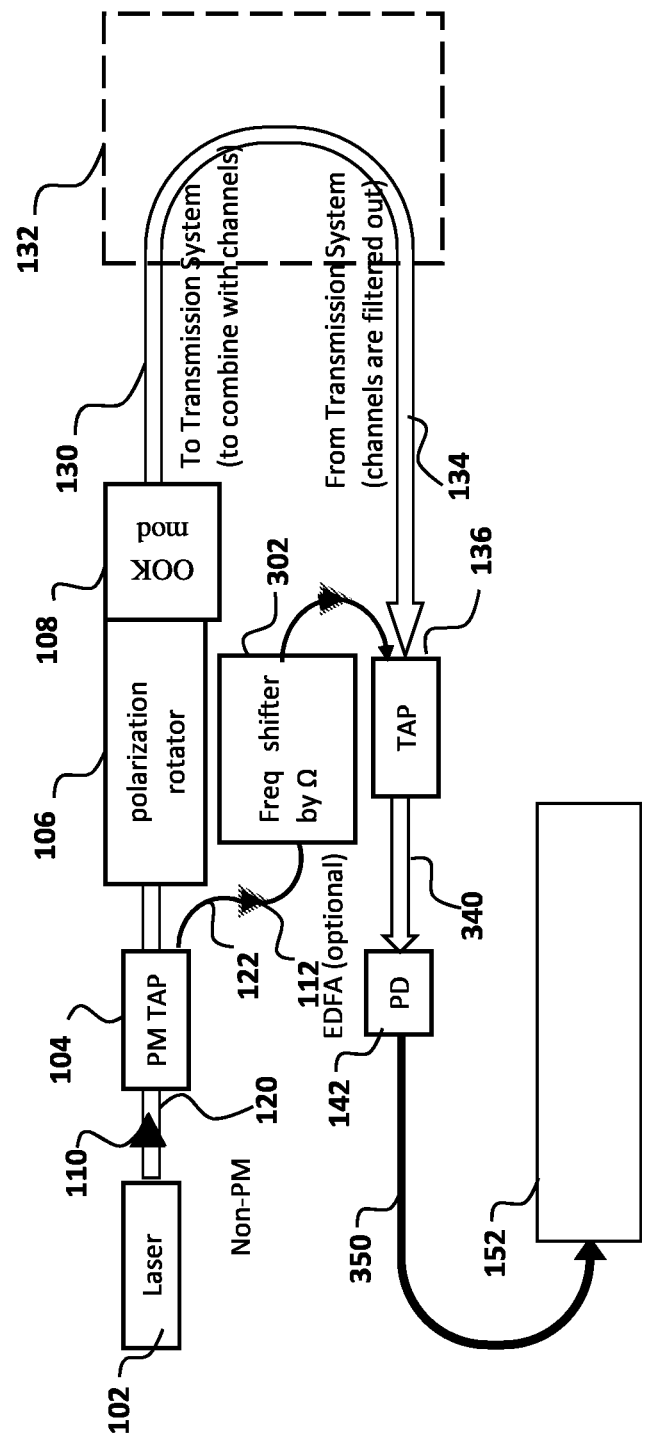
FIG. 3 is a schematic diagram illustrating an exemplary embodiment of a further line measurement system for testing an optical fiber, in accordance with the present disclosure.

To resolve the possible problems of the embodiments of FIGS. 1 and 2, FIG. 3 depicts a LMS organized based upon a slightly different approach. For this approach of FIG. 3 to work, in accordance with different embodiments, the laser probe beam may be a narrow band beam or may be slightly broadened as in the embodiments of FIGS. 1 and 2. A "narrow band" as used herein may refer to a bandwidth of the laser probe beam when output without broadening applied to the beam. As an example, a band less than 1 MHz wide may be considered to be a narrow band. In this example, an LMS 300 is shown, including some similar components to LMS 100 and LMS 200, where like components are labeled the same. In the embodiment, the LMS 300 includes a frequency shifter 302, arranged to shift the frequency of the second portion 122 of the probe beam 120. Detection of an interference signal 340 may be performed based upon a frequency difference (while in some embodiments, the sum of frequencies may be used). In this embodiment, the bandwidth of the power signal 350 should be either comparable to the bandwidth of the probe beam 120 or comparable to the bandwidth of the OOK signal, output by polarization rotator 106, whichever signal bandwidth is larger. Since the laser bandwidth and the bandwidth of the OOK signal can be smaller than that in the bandwidth-broadened laser in the embodiments of FIGS. 1 and 2, this approach can generate a much higher sensitivity.

Figure 4:
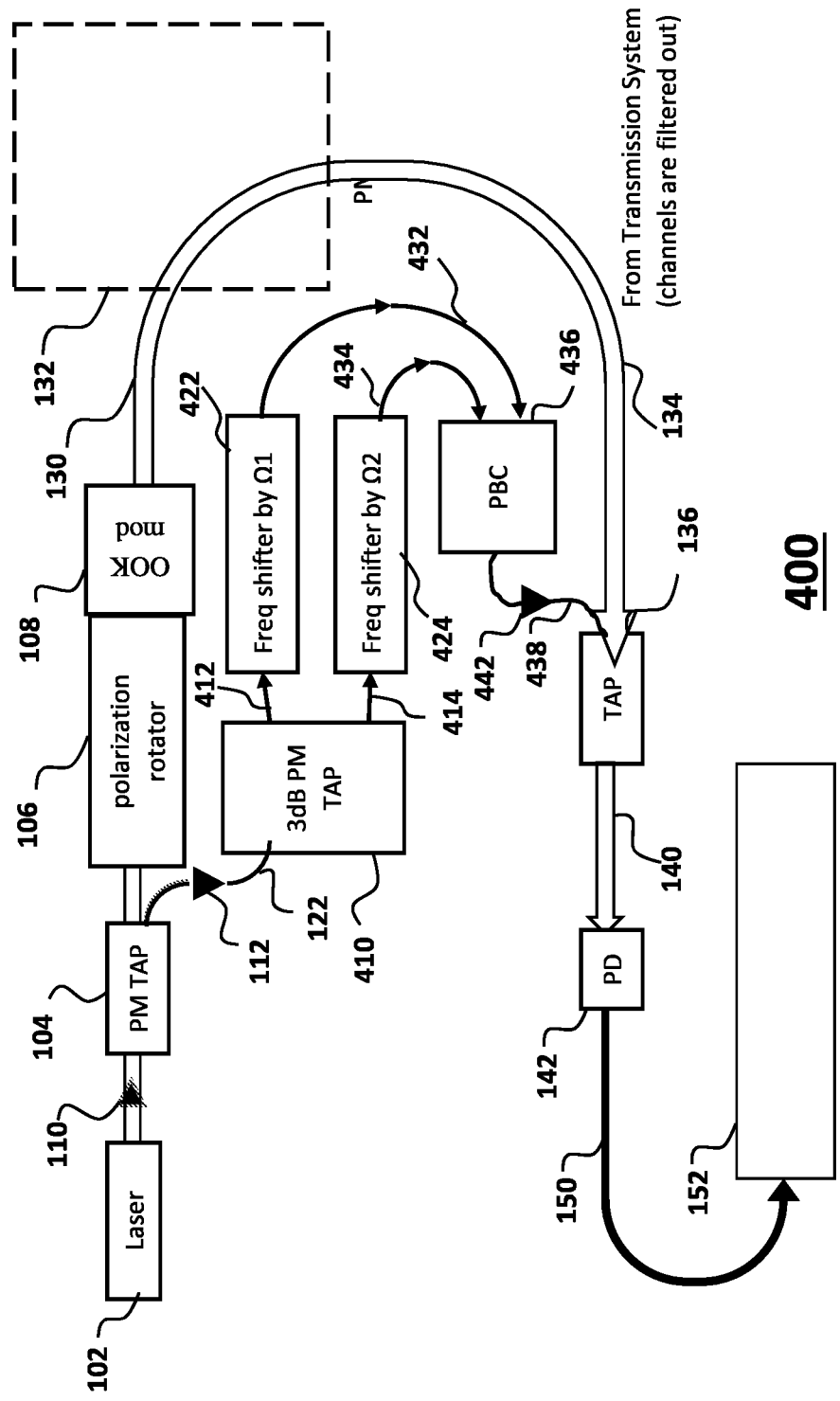
FIG. 4 is a schematic diagram illustrating an exemplary embodiment of still a further line measurement system for testing an optical fiber, in accordance with the present disclosure.

FIG. 4 is a schematic diagram illustrating an exemplary embodiment of still a further line measurement system for testing an optical fiber, in accordance with the present disclosure. The LMS 400 of FIG. 4 represents a dual polarization variant of the arrangement of FIG. 3. The LMS 400 includes an intermediate tap, shown as a tap 410 that receives the second portion 122 and outputs a signal 412 and a signal 414, to be received by a frequency shifter 422 and a frequency shifter 424, respectively. Frequency shifters are devices that shift frequency of the optical light by a given value Omega. Before being combined at return tap 136 a frequency shifted signal 432 and a frequency shifted signal 434 are output by the frequency shifter 422 and the frequency shifter 424. These two output signals are combined at a polarization beam combiner, shown as PBC 436 to generate a combined signal 438. This component combines two lights with a single polarization each at the input into a single fiber at the output. Again, in some embodiments, the polarization beam combiner may be a standard device, such as a commercially available device. Optionally, a third filter amplifier 442 may be disposed between the PBC 436 and return tap 136.

In the embodiment of FIG. 4, the detection at PD 142 takes place for two polarization happens at two different frequencies, and the averaged electrical power for each of the frequency (1 GHz-$\Omega$1, and 1 GHz-$\Omega$2) is summed up to obtain an electrical LMS response signal that is insensitive to time varying PDL.

While not specifically shown, in some embodiments, the technique of FIG. 4 may be implemented by performing measurements in both polarizations, using two polarization shifters and two detectors.

Further Embodiments of the Disclosure

In implementations where the LO light is likely to need amplification, amplifiers such as erbium-doped filter amplifiers (EDFAs) can be used in the noted locations shown in the aforementioned figures. Most likely just one EDFA may be needed. However, an EDFA by itself produces broadband noise that can negatively impact performance. Some filtering might accordingly be required before LO light of the second portion 122 is received by a detector. In this case one can put an optical filter that blocks most of the ASE (amplified spontaneous emission) light outside of the LO bandwidth. This filter may be a separate device, but may also be the same filter (usually a WSS, not separately shown in the transmission system of the figures) that filters out transmission channels. In this case the filter (or WSS) can be positioned between PD 142 and a return TAP 136 that combines the second portion 122 with returned LMS response optical signal, that is, the return signal.

Generally, the location of the aforementioned TAP will be defined by considerations such as cost and performance. Thus, according to some embodiments, multiple components may be placed between the TAP and PD and between the output of the transmission system 132 and the TAP. The salient consideration is the ratio between the LO signal (second portion 122) and total returned signal in the filtered optical bandwidth. According to embodiments of the disclosure, the LO light that is received by a tap that combines the LO light with a return signal from the transmission system 132 should be significantly larger (for example 15 dB larger) than the returned signal in the filtered optical bandwidth that is received by a PD. Other practical considerations such as optimal total power impinging on a PD are also parts of design considerations that may require additional optical components in the returned path such as VOAs, optical filters, taps, splitters and EDFAs.

Figure 5:
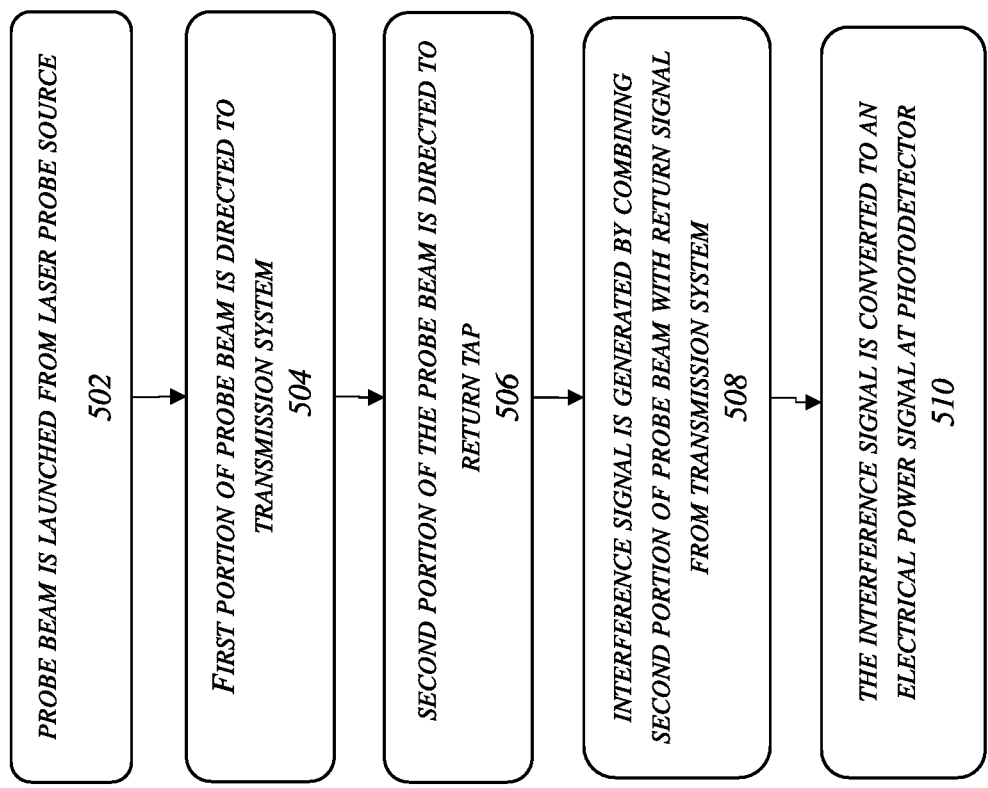
FIG. 5 presents an exemplary process flow.

FIG. 5 presents an exemplary process flow 500. At block 502, a probe beam is launched from a laser probe source. The laser probe source may be an external cavity laser in some embodiments. The probe beam may be broadened in some embodiments and may be a narrow band beam in other embodiments.

At block 504, a first portion of the probe beam is directed to a transmission system, where the first portion is manipulated and conducted through the transmission system to generate a return signal. For example, the first portion may be sent through a polarization rotator to the transmission system, which system then generates a return signal At block 506, a second portion of the probe beam is directed to a return tap. For example, the second portion of the probe beam may be split off from the first portion at a polarization maintaining tap.

At block 508, an interference signal is generated by combining the first portion of the probe beam with a return signal from the transmission system, where the return signal is based upon the first portion of the probe beam. For example, the return signal may be derived from the first portion of the probe beam after conduction through the transmission system with the carrier channels filtered out.

At block 510, the interference signal is converted to an electrical power signal at a photodetector. The electrical power signal may be measured at one or more different frequencies according to different embodiments. In various embodiments, the bandwidth of electrical filter is much smaller than an optical bandwidth of 25 GHz, for example, and thus a significant portion of the noise that would otherwise be present is removed.

Figure 6:
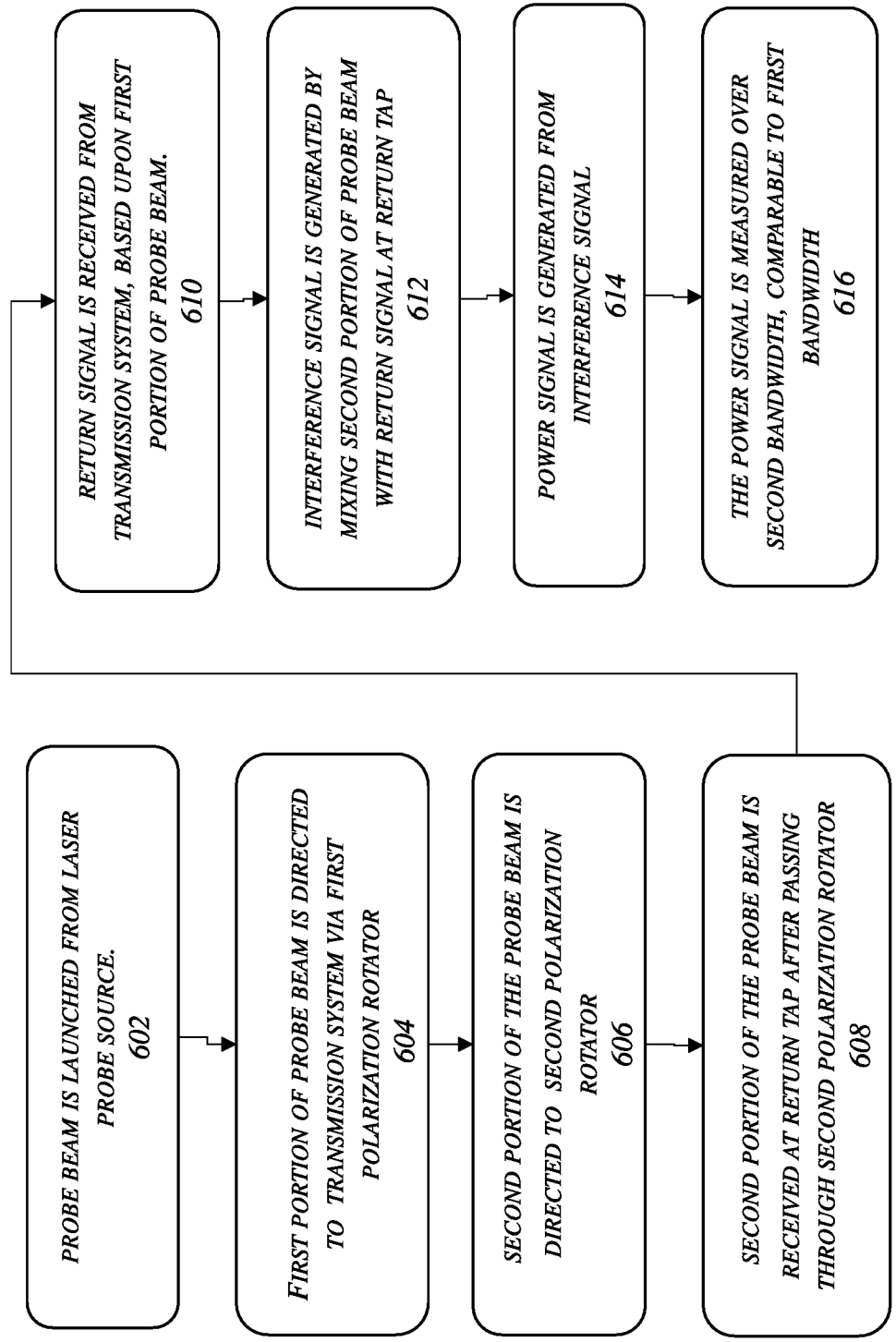
FIG. 6 presents another exemplary process flow.

FIG. 6 presents an exemplary process flow 600. At block 602, a probe beam is launched from a laser probe source. The probe beam may be characterized by a first bandwidth, where the probe beam is broadened in some embodiments and may be a narrow band beam in other embodiments.

At block 604, a first portion of the probe beam is directed to a transmission system. In one example, the first portion may be sent through a polarization rotator to the transmission system, where the polarization rotator operates at a predetermined frequency, such as 1 GHz.

At block 606 a second portion of the probe beam is sent to a second polarization rotator. For example, a polarization maintaining tap may split the first portion and second portion of the probe beam, and send the second portion to the second polarization rotator.

At block 608, the second portion is received at a return tap after passing through the second polarization rotator.

At block 610, a return signal is received from the transmission system, where the return signal is based upon the first portion of the probe beam. The return signal may be derived from the first portion of the probe beam after conduction through the transmission system with the carrier channels filtered out. The return signal may be received at the return tap that receives the second portion of the probe beam.

At block 612, the second portion of the probe beam is mixed with the return signal to generate an interference, such as in the return tap.

At block 614 a power signal is generated from the interference signal, such as by using a single photodetector.

At block 616, the power signal is measured over a second bandwidth, comparable to the first bandwidth. In one non-limiting example, the first bandwidth may be approximately 25 MHz, while the second bandwidth is also approximately 25 MHz.

Figure 7:
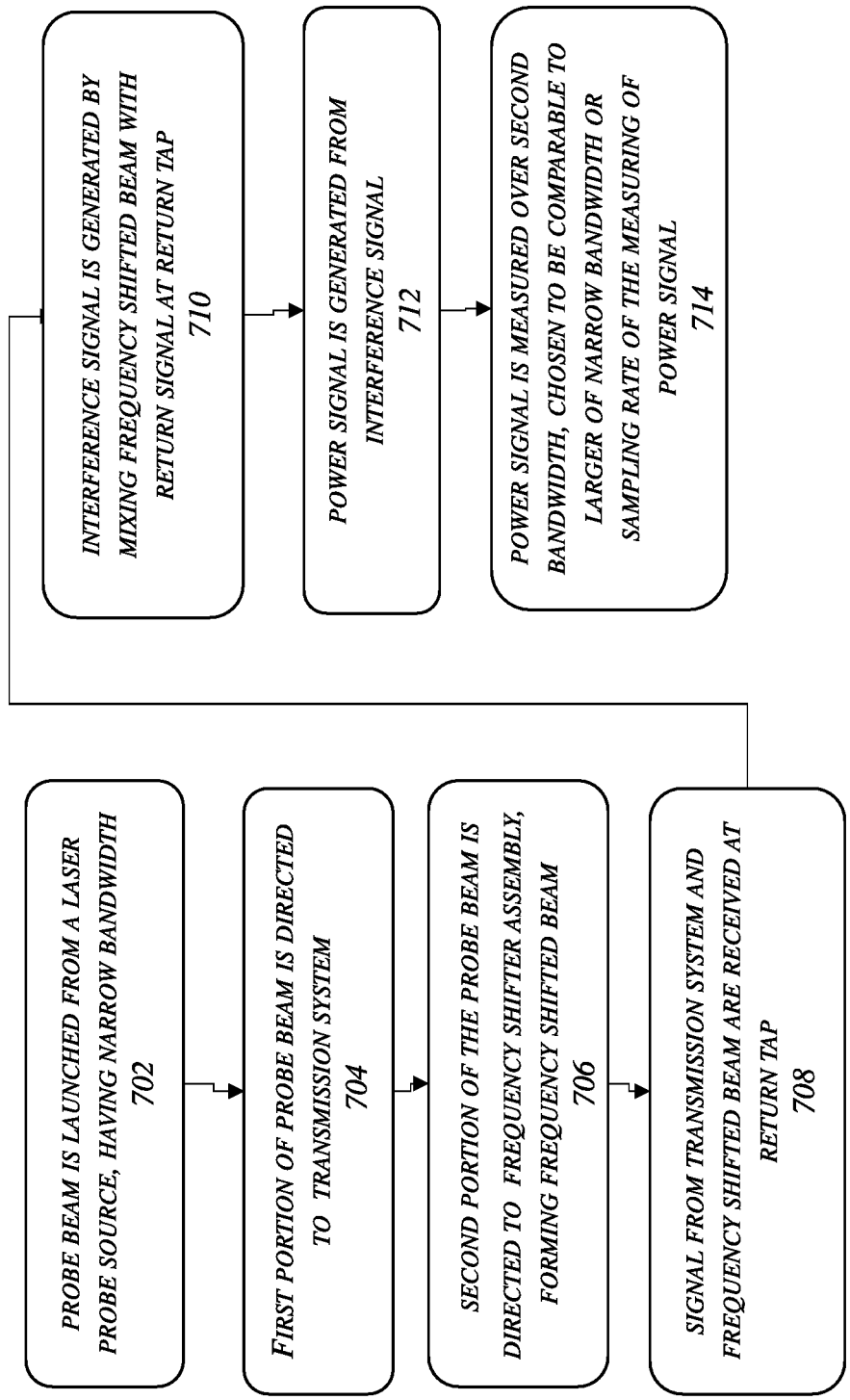
FIG. 7 presents a further exemplary process flow.

FIG. 7 presents an exemplary process flow 700. At block 702, a probe beam is launched from a laser probe source. The probe beam may be characterized by a narrow bandwidth.

At block 704, a first portion of the probe beam is directed to a transmission system. In one example, the first portion may be sent through a polarization rotator to the transmission system, where the polarization rotator operates at a predetermined frequency, such as 1 GHz.

At block 706, a second portion of the probe beam is sent to a frequency shifter assembly to form a frequency shifted beam.

At block 708, the frequency shifted beam and a return signal from the transmission system are received at a return tap, where the return signal frequency is based upon the first portion of the probe beam.

At block 710, the frequency shifted beam and the return signal are mixed to generate an interference signal.

At block 712, a power signal is generated based upon the interference signal. The power signal may be generated at a photodetector, where the detection is based upon the frequency difference of the signals, or alternatively, an addition of the frequency of the signals.

At block 714, the power signal is measured over a second bandwidth. The second bandwidth may be chosen to be comparable to the larger of the narrow bandwidth or the sampling rate of the measuring of the power signal.

Figure 8:
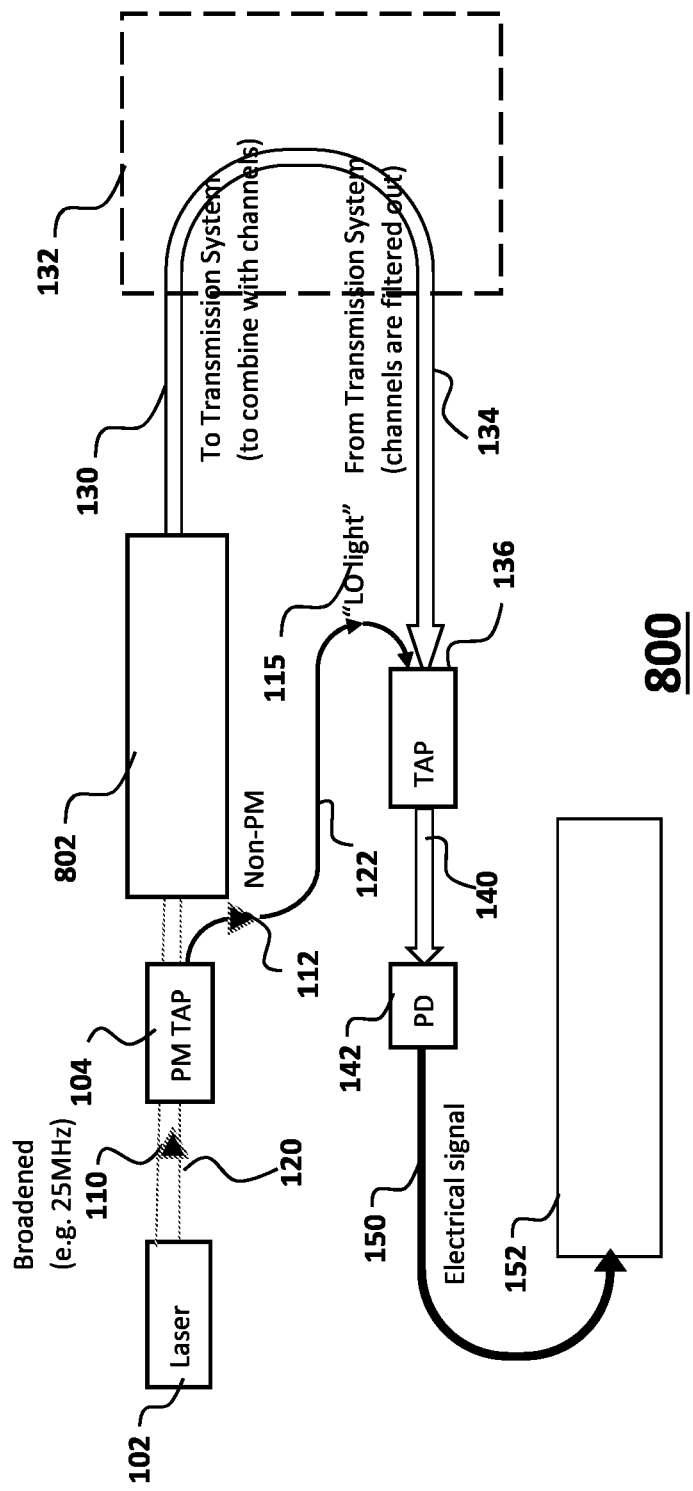
FIG. 8 is a schematic diagram illustrating another embodiment of a line measurement system for testing an optical fiber, in accordance with the present disclosure.

In summary, the present embodiments provide apparatus and techniques where an LMS system is provided such that, a portion of light that is generated from a laser probe source is split sending to a transmission system, and is added to the return signal using a tap. This split portion of the light may interfere with the returned signal where the interference is detected by a single photodetector. FIG. 8 provides a general arrangement, where the arrangement 800 shown includes the same components as FIG. 1 generally, with like components labeled the same. The arrangement 800 includes a pre-transmission block 802, where processing of the probe beam 120 may take place according to known LMS systems, before a return signal in combined with the second portion 122 of the probe beam 120. Thus, the pre-transmission block 802 may include components other than the polarization/OOK block described above.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A line monitoring system, comprising:
 a laser source to launch a probe signal over a first bandwidth;
 a polarization maintaining tap to receive the probe signal, and to split the probe signal into a first portion and a second portion;
 a polarization rotator to receive the first portion of the probe signal and send the first portion to a transmission system;
 a return tap to receive the second portion of the probe signal and to receive a return signal from the transmission system, wherein the return signal being derived from the first portion of the probe signal,
a photodetector coupled to receive an interference signal from the return tap, wherein the interference signal is generated by a mixing the return signal and the second portion of the probe signal, the photodetector arranged to output a power signal based upon the interference signal; and
a power measurement system to measure the power signal at a given measurement frequency, wherein the given measurement frequency is derived from a frequency of the polarization rotator.

2. The line monitoring system of claim 1, wherein the polarization rotator further comprises an on-off-keying (OOK) component to modulate the first portion with OOK data.

3. The line monitoring system of claim 1, further comprising a second polarization rotator to receive the second portion of the probe signal, to apply a rotation and to send the second portion after rotation to the return tap.

4. The line monitoring system of claim 1, further comprising a frequency shifter assembly, arranged to receive the second portion and apply a frequency shift to the second portion, and transmit the second portion to the return tap.

5. The line monitoring system of claim 4, wherein the frequency shifter assembly comprises a first frequency shifter and a second frequency shifter, the line monitoring system further comprising:
an intermediate tap, arranged to receive the second portion from the polarization maintaining tap, to output a first part of the second portion to the first frequency shifter, and to output a second part of the second portion to the second frequency shifter; and
a polarization beam combiner to receive a first frequency shifted beam from the first frequency shifter and to receive a second frequency shifted beam from the second frequency shifter, and output the second portion as a combined beam to the return tap.

6. The line monitoring system of claim 5, wherein the intermediate tap is a second polarization maintaining tap.

7. The line monitoring system of claim 1, further comprising at least one filter amplifier, disposed to intercept at least a portion of the probe signal, between the laser source and the return tap.

8. The line monitoring system of claim 1, wherein the probe signal comprises a bandwidth of 25 MHz.

9. The line monitoring system of claim 1, wherein the power signal comprises a frequency of 25 MHz to 5 GHz, and wherein the power measurement system is configured to measure over a sampling period of 50 μs to 500 μs.

10. The line monitoring system of claim 1, wherein a rotation frequency of the polarization rotator is 1 GHz.

11. The line monitoring system of claim 1, wherein the given measurement frequency corresponds to a frequency of the polarization rotator.

12. The line monitoring system of claim 3, wherein the given measurement frequency corresponds to:
a difference between a rotation frequency of the polarization rotator and a rotation frequency of the second polarization rotator; or
a sum of the rotation frequency of the polarization rotator and the rotation frequency of the second polarization rotator.

13. The line monitoring system of claim 5, wherein the given measurement frequency corresponds to two different frequencies.

14. A method of measuring a fault in a transmission system, comprising:
launching a probe beam from a laser probe source, the probe beam having a first bandwidth;
directing a first portion of the probe beam through a polarization rotator and to a transmission system;
directing a second portion of the probe beam to a return tap;
receiving at the return tap, a return signal from the transmission system, the return signal being based upon the first portion of the probe beam;
mixing the second portion of the probe beam and the return signal to generate an interference signal;
generating a power signal based upon the interference signal; and
measuring the power signal at a given measurement frequency, wherein the given measurement frequency is derived from a frequency of the polarization rotator.

15. The method of claim 14, wherein the directing the first portion comprises:
directing the first portion through the polarization rotator; and
modulating the first portion using an on-off-keying (OOK) component, for sending to the transmission system.

16. The method of claim 14, wherein the probe beam comprises a bandwidth of 25 MHz.

17. The method of claim 14, wherein the measuring the power signal comprises measuring at a frequency of 25 MHz to 5 GHz and a sampling period of 50 μs to 500 μs.

18. The method of claim 14, the directing the second portion comprising directing the second portion through a second polarization rotator before the second portion is received at the return tap.

19. A method of measuring a fault in a transmission system, comprising:
launching a probe beam from a laser probe source, the probe beam having a narrow bandwidth;
directing a first portion of the probe beam through a polarization rotator and to a transmission system;
directing a second portion of the probe beam to a frequency shifter assembly to form a frequency shifted beam;
receiving at a return tap, the frequency shifted beam and a return signal from the transmission system, the return signal being based upon the first portion of the probe beam;
mixing the frequency shifted beam and the return signal to generate an interference signal;
generating a power signal based upon the interference signal; and
measuring the power signal at a given measurement frequency over a second bandwidth, equal to the narrow bandwidth or equal to a larger one of: the first bandwidth and a sampling rate of the measuring the power signal.

20. The method of claim 19, wherein the directing the second portion of the probe beam comprises:
shifting a first part of the second portion of the probe beam by a first frequency shifter to form a first frequency shifted beam;
shifting a second part of the second portion of the probe beam by a second frequency shifter to form a second frequency shifted beam; and
combining the first frequency shifted beam and the second frequency shifted beam, in order to form the frequency shifted beam.

21. The method of claim 19, wherein the measuring the power signal comprises measuring at a first frequency of the first frequency shifted beam and at a second frequency of the second frequency shifted beam.

\* \* \* \* \*